Figure 1:
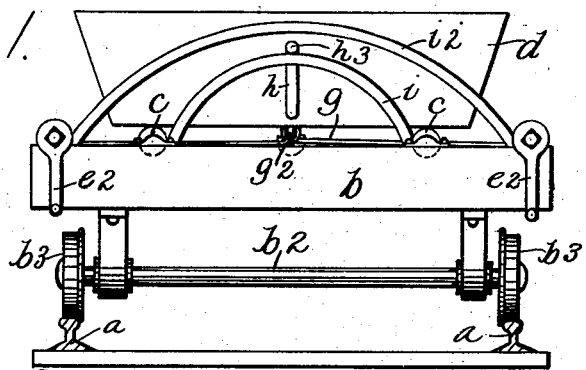

No. 732,544. PATENTED JUNE 30, 1903.
S. E. GLADDING.
DUMPING TRUCK OR CAR.
APPLICATION FILED MAR. 13, 1903.
NO MODEL.

WITNESSES
S. L. Grotheimer.
F. A. Stewart.

INVENTOR
Samuel Ellis Gladding
BY Edgar Late & Co.
ATTORNEYS

THE NORRIS PETERS CO., PHOTO-LITHO., WASHINGTON, D. C.

No. 732,544. Patented June 30, 1903.

UNITED STATES PATENT OFFICE.

SAMUEL ELLIS GLADDING, OF JERSEY CITY, NEW JERSEY.

DUMPING TRUCK OR CAR.

SPECIFICATION forming part of Letters Patent No. 732,544, dated June 30, 1903.

Application filed March 13, 1903. Serial No. 147,559. (No model.)

*To all whom it may concern:*

Be it known that I, SAMUEL ELLIS GLADDING, a citizen of the United States, residing at Jersey City, in the county of Hudson and State of New Jersey, have invented certain new and useful Improvements in Dumping Trucks or Cars, of which the following is a specification, such as will enable those skilled in the art to which it appertains to make and use the same.

The object of this invention is to provide improved means for dumping the load of a truck, car, or similar carriage or vehicle; and with this and other objects in view the invention consists in the construction, combination, and arrangement of parts hereinafter described and claimed.

The invention is fully disclosed in the following specification, of which the accompanying drawings form a part, in which the separate parts of my improvement are designated by suitable reference characters in each of the views, and in which—

Figure 2:
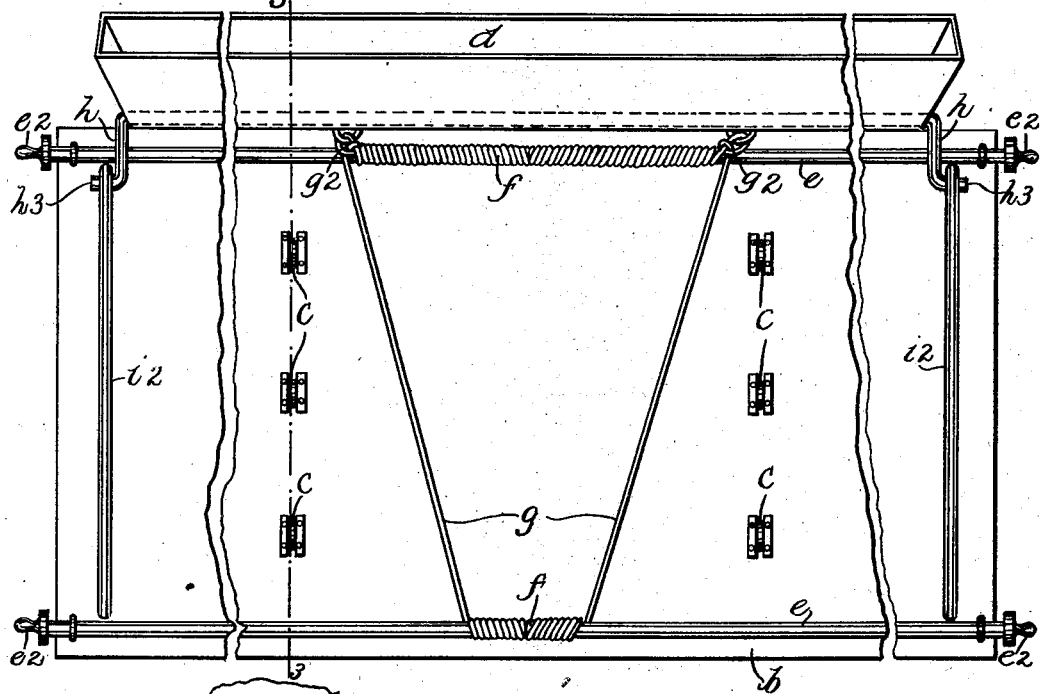

Figure 1 is an end view of an ordinary truck made in the manner of a car and provided with my improved dumping mechanism; Fig. 2, a plan view thereof and showing the bed or body in a dumping position, and Fig. 3 a cross-section on the line 3 3 of Fig. 2.

In the drawings forming part of this specification I have shown at $a$ the rails of a railway-track and at $b$ the frame or body of a truck, which is mounted thereon and provided with axles $b^2$ and wheels $b^3$; but my invention is in no way limited to the construction of the truck, and the same may be applied to any kind or class of trucks as well as to ordinary cars.

In the practice of my invention I place in the bottom or framework of the truck transversely-arranged rollers $c$, any desired number of which may be employed and which may be supported in any desired manner and may be of any preferred form, and these rollers are designed to normally support the box or bed $d$, which is designed to carry the load.

At each side of the frame or bottom of the truck is placed a shaft $e$, and these shafts are parallel and may be supported by or provided with any suitable bearings, and secured to and wound on each of these shafts at $f$ are cords $g$, and said cords are also secured to the box or bed $d$, as shown at $g^2$.

At each end of the box or bed $d$ is a loosely-supported crank $h$, and in the form of construction shown these cranks are connected with and form a part of a shaft $h^2$, which passes loosely through the bottom of the box or bed $d$ and is free to turn therein, and each of the cranks $h$ is provided at its free end with an outwardly-directed member $h^3$. The shafts $e$ are also provided at one end with a crank $e^2$, by means of which they may be turned in either direction, and at the opposite ends of the frame or bottom of the truck are arranged curved guides $i$ and $i^2$, between which the outwardly-directed members $h^3$ of the cranks $h$ operate.

Figure 3:
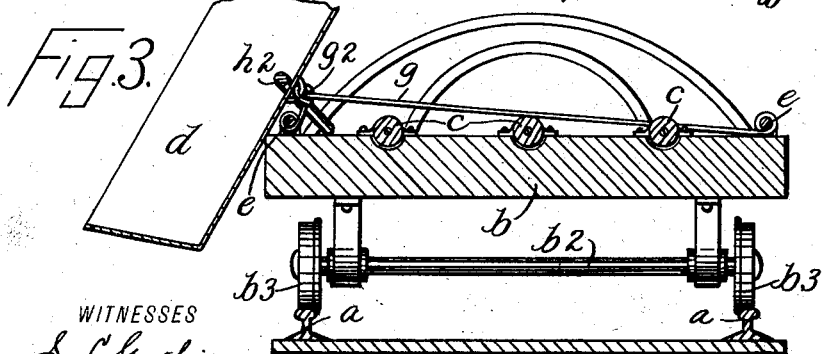

In the normal position of the box or bed $d$ it rests centrally on the truck or car frame and on the rollers $c$, as shown in Figs. 1 and 3, and in order to dump the same, as shown in Fig. 2, the left-hand shaft $e$ is turned so as to wind the corresponding cords $g$ thereon. This operation gradually draws the box or bed over toward the left-hand side of the car or truck, and when it reaches its extreme lateral position it may be tilted easily, so as to drop into the position shown in Fig. 2, and the load will be dumped, as will be readily understood. In this operation the cranks $h$ engage with the upper guides $i^2$ and prevent the bed or body from swinging too far out or being entirely detached from the truck of the car, this position of said cranks being shown in Figs. 2 and 3, and whenever it is desired to return the bed or box to its normal position, or that shown in Fig. 1, the right-hand shaft $e$ is turned so as to wind the corresponding cords $g$ thereon, and in this operation the bed or box is drawn back into the position shown in Fig. 1. In the movement of the bed or box toward one side or the other of the truck or car the members $h^3$ of the cranks $h$ rest on the guides $i$ until the turning or dumping of the box or bed begins, at which time the said members $h^3$ of the cranks $h$ come in contact with the inner or bottom surfaces of the guides $i^2$, and thus said cranks and the said guides always hold the bed or box in proper position.

In the form of construction shown the guides $i$ and $i^2$ simply consist of curved bars, and these may be secured to the truck-frame in any desired manner; but these guides may be formed in various ways and other changes in and modifications of the construction herein described may be made without departing from the spirit of my invention or sacrificing its advantages, and I reserve the right to make all such alterations therein as fairly come within the scope of the invention.

Having fully described my invention, what I claim as new, and desire to secure by Letters Patent, is—

1. A truck or car provided with rollers arranged transversely thereof and a bed or body resting thereon, shafts supported at the opposite sides of the truck or car, cords connected with said shafts and with the bottom portion of the bed or body, curved guides connected with the truck or car at the opposite ends thereof and cranks connected with the opposite ends of the bed or body and operating between said guides, substantially as shown and described.

2. In an apparatus of the class described a truck-frame, a bed or body mounted thereon, shafts supported at the opposite sides of the truck-frame, cords connected with said shaft and with the bed or body, curved guides supported at the opposite ends of the truck-frame and cranks loosely connected with the ends of the bed or body and operating between said guides, substantially as shown and described.

In testimony that I claim the foregoing as my invention I have signed my name, in presence of the subscribing witnesses, this 3d day of March, 1903.

SAMUEL ELLIS GLADDING.

Witnesses:
   IDA C. H. GLADDING,
   HENRY CHAPIN.